United States Patent Office 3,371,040
Patented Feb. 27, 1968

3,371,040
LUBRICANT AND FUEL COMPOSITIONS
William D. Emmons, Huntingdon Valley, Pa., assignor to Rohm & Haas Company, Philadelphia, Pa., a corporation of Delaware
No Drawing. Continuation-in-part of application Ser. No. 368,737, May 19, 1964. This application June 7, 1967, Ser. No. 644,769
12 Claims. (Cl. 252—51.5)

ABSTRACT OF THE DISCLOSURE

This invention relates to novel compositions of matter. It further relates to fuels and lubricants having incorporated therein as an essential ingredient an oil-soluble polymer prepared from at least one monomer having the following general formula

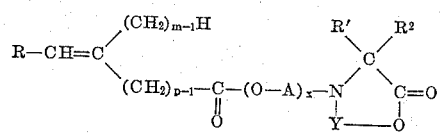

wherein R is selected from the group consisting of H and methyl, $m$ is an integer having a value of 1 to 3, $p$ is an integer having a value of 1 to 4, $x$ is an integer having a value of 1 to 40, A is an alkylene group having 2 to 4 carbon atoms.

R′ and R² are selected from the group consisting of (1) a composite group which forms a cyclic ($C_5$ to $C_7$) hydrocarbon group with the adjoined C atom and (2) separate groups in which R′ is selected from the group consisting of H, ($C_1$–$C_8$) alkyl, and phenyl and R² is selected from the group consisting of H and ($C_1$–$C_8$) alkyl.

Y is an alkylene group having 2 to 3 carbon atoms, A and Y having at least two carbon atoms extending in a chain between the adjoined O and N atoms, with the provisos that, when $p$ is greater than 1, $m$ is 1 and, when $m$ is greater than 1, R is H.

The compositions of the present invention are produced by incorporating from about 0.001% to 10% by weight of at least one of the above-described polymers in the oil and fuel base contemplated.

Cross references to related applications

This application is a continuation-in-part of United States application Ser. No. 368,737, filed May 19, 1964.

Description of the invention

This application relates to novel compositions of matter and further relates to fuels and lubricants having incorporated therein as an essential ingredient an oil-soluble polymer prepared from a monomer of the following general formula

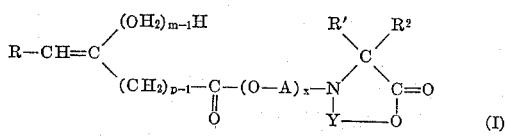
(I)

wherein R is selected from the group consisting of H and methyl, $m$ is an integer having a value of 1 to 3, preferably 1–2, $p$ is an integer having a value of 1 to 4, $x$ is an integer having a value of 1 to 40, preferably 1–2, A is an alkylene group having 2 to 4 carbon atoms.

R′ and R² are selected from the group consisting of (1) a composite group which forms a cyclic ($C_5$ to $C_7$) hydrocarbon group with the adjoined C atom and (2) separate groups in which R′ is selected from the group consisting of H, ($C_1$–$C_8$) alkyl, and phenyl and R² is selected from the group consisting of H and ($C_1$–$C_8$) alkyl.

Y is an alkylene group having 2 to 3 carbon atoms, A and Y having at least two carbon atoms extending in a chain between the adjoined O and N atoms, with the provisos that, when $p$ is greater than 1, $m$ is 1 and, when $m$ is greater than 1, R is H.

The fuel compositions exhibit stability and rust protection. The lubricant compositions are characterized by dispersant-detergent properties, pour-point depressing action and viscosity improvements. The lubricants are especially outstanding in sludge dispersant properties.

The compounds designated hereinabove may be prepared by transesterification of an ester of the formula

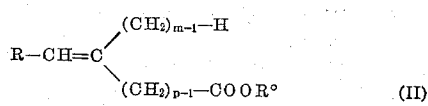
(II)

wherein $m$, $p$, and R are as defined hereinabove and R° is any hydrocarbon radical of an alcohol, preferably a saturated lower aliphatic alcohol, such as methanol, ethanol, isopropanol or butanol, with an N-substituted-morpholinone-2 of the formula

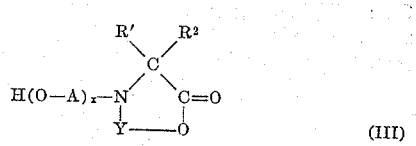
(III)

wherein A, $x$, R′ and R² and Y are as previously defined. The reaction is effected under alkaline conditions in the presence of about ½% to 10%, and preferably 1 to 5%, by weight, based on the weight of the starting alcohol, of a tetraalkyl titanate, such as the tetraisopropyl or tetrabutyl titanate. No solvent is needed. While the starting materials may be employed in stoichiometrically equivalent amounts, it is preferred that the ester be employed in excess. The alcohol liberated during the transesterification is removed by azeotropic distillation of a mixture of the alcohol and the starting monomeric ester, such as methyl methacrylate or methyl acrylate. It is not necessary but sometimes desirable that a polymerization inhibitor be employed such as para-hydroxydiphenylamine or diphenylphenylenediamine. The reaction is generally carried out at temperatures of about 100° to 130° C. and the completion of the reaction can be determined by measuring the amount of alcohol removed and thereby determining when the theoretical amount of alcohol liberated has been taken out of the system by distillation.

Instead of using tetraalkyl titanate, the transesterification may be carried out in the presence of an alkali metal ($C_1$–$C_4$) alkoxide, the amount thereof varying from 0.2% to 5%, and preferably 1 to 3%, based on the weight of the starting alcohol. Whereas the use of tetraalkyl titanate is applicable to the preparation of any of the esters, the alkali metal alkoxide system is preferred for the transesterification of acrylates and methacrylates. Sodium methoxide or ethoxide as well as the potassium and lithium analogs may be employed. In this system, the ester and the morpholinone are mixed and a solution of the alkoxide in an alcohol such as methanol is added gradually. No additional solvent is needed, the ester itself serving this purpose. The temperature may be from 100° to 140° C. and is preferably not over 130° C.

The esters, and preferably the methyl or ethyl esters, of the following unsaturated acids are representative of those that may be used:

Acrylic
Methacrylic
Crotonic
4-pentenoic
3-pentenoic
5-hexanoic
2-methyl-4-pentenoic
3-methyl-4-pentenoic The hydroxyalkyl compounds of Formula III are generally a known class of compounds. They may be obtained by the reaction in conventional fashion of an alkylene oxide having 2 to 4 carbon atoms, e.g., ethylene oxide, propylene oxide, 1,2-butylene oxide, or 2,3-butylene oxide, with a compound of the formula

   (IV)

wherein R' and R² are as defined hereinbefore and M is an alkali metal, such as sodium, potassium, or lithium. Approximately two moles of the alkylene oxide are used per mole of the compound of Formula IV. The reaction, taking ethylene oxide as an example, produces the following compound

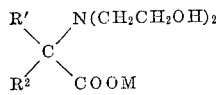

On acidifying, e.g., with HCl, and removing water in an azeotrope, e.g., with added isooctyl alcohol, the compound cyclizes to the following

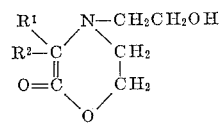

A specific example is as follows:

To 250 ml. of 4 M sodium hydroxide (10 moles) was added one mole of α-amine acetic acid. The resulting solution was cooled to 0° C. by means of a salt ice bath and, from a weighed cylinder and by means of a "dip tube," 92.4 g. (2.1 moles) of ethylene oxide was added. The addition was adjusted so that the reaction temperature could be maintained below 10° C. The reaction solution was stirred for approximately 8 hours at 0° C. and 6 hours at ambient temperatures. The solution was neutralized with concentrated hydrochloric acid to a pH of 5.6 and concentrated under reduced pressure. The resulting semi-solid residue was added 250 ml. of isooctyl alcohol and the mixture was brought to reflux under conditions allowing for removal of the alcohol-water azeotrope. Reflux was continued until water was no longer obtained (193° C.). The isooctyl alcohol was removed by distillation under reduced pressure followed by distillation of resulting crude N-hydroxyethyl-morpholinone. Although this illustrative synthesis procedure is given herein, nevertheless the preparation of the N-substituted-morpholinones of Formula III is well known in the art and their preparation is no part of the present invention.

The compounds of Formula III in which x is 2 to 40 may be obtained in various ways. For example, a hydroxy (poly)alkoxyamine of the formula H(OA)$_x$—NH$_2$ (in which x is 2 to 40) may be reacted with a (C$_2$–C$_4$) alkylene oxide to form the compound H(OA)$_x$—NH—AOH (IIIA) by mixing the alkylene oxide with the amine in approximately 1:1 mole ratio and heating the mixture, such as to 130 to 180° C., in a suitable vessel, under pressure if necessary. The product is then mixed with an alkali metal α-chloroacetate, such as sodium chloroacetate, in approximately 1:1 mole ratio and the mixture heated to reflux for a period of one to eight hours or more, depending on the size of the batch. Before reacting with the chloroacetate, the compound of Formula IIIA obtained may be isolated and/or purified, as by fractional distillation and/or extraction. After completion of the reaction with chloroacetate, which may be indicated by a drop of the pH to the vicinity of the neutral point, e.g., about 6.5 to 7.5, the water may be removed by azeotropic distillation, such as with a long-chain alcohol, and excess of the latter removed, as by distillation under low pressure.

The Formula I monomers can be homopolymerized or copolymerized with one or more ethylenically unsaturated polymerizable monomers. It is, of course, necessary for the present purposes that the polymers have sufficient oil solubility to be incorporated into the compositions of this invention, to be more fully delineated hereinafter.

Suitable as comonomers are alkyl and aryl acrylates in which the alkyl or aryl portion contains preferably 1 to 18 carbon atoms; alkyl and aryl methacrylates in which the alkyl or aryl portion contains preferably 1 to 18 carbon atoms; acrylonitrile; methacrylonitrile, alkylaminoalkyl and dialkylaminoalkyl acrylates and methacrylates; acrylamide and methacrylamide and their N-alkyl substituted derivatives; dialkylacrylamide and dialkylmethacrylamide and their N-dialkyl substituted derivatives; styrene and alkyl ring-substituted styrenes containing no more than a total of about 20 carbon atoms; α-methylstyrene; vinyl esters, in which the carboxylate portion contains 1 to 18 carbon atoms, including the carbon of the carboxylate function; vinyl alkyl ethers and vinyl alkyl sulfides in which the alkyl portion contains no more than 18 carbon atoms and N-vinyl lactams, preferably containing from 6 to 20 carbon atoms; alkyl vinyl sulfones in which the alkyl portion contains up to about 18 carbon atoms; N-vinylalkyleneureas containing from 5 to 12 carbon atoms; olefins, such as isobutylene, butadiene and isoprene; dialkyl fumarates of up to 24 carbon atoms; dialkyl maleates of up to 24 carbon atoms; and dialkyl itaconates of up to 24 carbon atoms; and vinylpyridines.

In the above monomers, the alkyl groups may exhibit any possible spatial configuration, such as normal, iso, or tertiary. These alkyl groups may be acyclic or cyclic, including alkyl-substituted cyclic, as long as the total carbon content conforms to the defined amount. In the ring substituted styrenes, the substituents may occupy any possible ring location or locations and when the substituents are alkyl groups, they may have any possible spatial configuration.

Typical of the above monomers that may be employed are methyl acrylate,
isopropyl acrylate,
cyclopentyl acrylate,
2-ethylhexyl acrylate,
decyl acrylate,
dodecyl acrylate,
octadecyl acrylate,
methyl methacrylate,
t-butyl methacrylate,
cyclohexyl methacrylate,
octyl methacrylate,
undecyl methacrylate,
dodecyl methacrylate,
phenyl methacrylate,
dimethylaminoethyl methacrylate,
methoxyethoxyethyl methacrylate,
t-butylaminoethyl methacrylate,
t-dodecylaminoethyl acrylate,
octadecyl methacrylate,
acrylonitrile,
methacrylonitrile,
N,N-dibutyl acrylamide,
acrylamide, N-methacrylamide,
N-t-octylacrylamide,
styrene,
p-butylstyrene,
p-octylstyrene,
o-chlorostyrene,
o,p-dipropylstyrene,
p-cyanostyrene,
o-methyl-p-decylstyrene,
ureidoethyl vinyl ether,
butyl vinyl sulfide,
octyl vinyl sulfide,
octadecyl vinyl sulfide,
hydroxyethyl vinyl sulfide,
N-vinyl-2-pyrrolidinone,
N-vinyl-5-methyl-2-pyrrolidinone,
N-vinyl-4,4-dimethyl-2-pyrrolidinone,
N-vinyl-4-butyl-5-octyl-2-pyrrolidinone,
N-vinyl piperidone,
N-vinyl-6-methyl-2-piperidone,
N-vinyl-6-octyl-2-piperidone,
N-vinyl-2-oxohexamethylenimine,
N-vinyl-5,5-dimethyl-2-oxohexamethylenimine,
N-vinyl-4-butyl-5-octyl-2-oxohexamethylenimine,
methyl vinyl sulfone,
isobutyl vinyl sulfone,
t-octyl vinyl sulfone,
dodecyl vinyl sulfone,
octadecyl vinyl sulfone,
N-vinylethyleneurea,
N-vinyltrimethyleneurea,
N-vinyl-1,2-propyleneurea,
N-vinylbutyleneurea,
N-vinylcarbazole,
vinyl acetate,
vinyl stearate,
dimethyl maleate,
dioctyl maleate,
dimethyl itaconate,
dibutyl itaconate,
dihexyl itaconate,
dimethyl fumarate,
diethyl fumarate,
dioctyl fumarate,
dibutyl fumarate,
diodecyl fumarate,
dibutyl maleate,
dihexyl maleate,
didecyl maleate,
diethyl itaconate,
dioctyl itaconate,
didodecyl itaconate,
vinyl pyridine,
2-methyl-5-vinylpyridine,
N-vinyl caprolactam,
N-vinyl-3-morpholinone,
N-vinyl oxazolidinone,
N-vinyl-5-ethyl-2-oxazolidinone,
N-vinyl-5-methyl-2-oxazolidinone,
N-(2-acryloxyalkyl)-2-oxazolidinone,
N-(2-methacryloxyethyl)-2-oxazolidinone,
N-acryloxy- or methacryloxyalkyloxazolidines,
N-(2-acryloxyethyl)-2-pyrrolidinone,
N-(2-methacryloxyalkyl)-2-pyrrolidinone,
N-acrylyl-3-morpholinone and
N-vinyl succinimide.

Typical of residues containing phosphorus which can be used in copolymerization with Formula I monomers are dibutylphosphitoethyl, 2-diethylphosphitopropyl, or diethylphosphitobutyl, such as shown in U.S. Patent 2,934,554 or diethylphosphonomethyl, such as shown in U.S. Patent 2,934,555. Polymerizable sulfur compounds, such as described in U.S. Patent 3,102,863, may also be incorporated in copolymers of the N-(2-methacryloxyalkyl)-2-morpholinones.

It is understood that in many cases it will be desirable, and frequently preferred, to combine one or more of the above copolymers in order to achieve various modifications and properties in the product contemplated. It is, of course, necessary for the present purposes that the copolymers have sufficient oil solubility and, as will be apparent to one skilled in the art, the comonomer should be selected to impart this oil solubility.

Typical comonomers that impart oil solubility include acrylates and methacrylates, in which the alcohol residue contains 6 to 18 carbon atoms, and itaconates, fumarates and maleates, in which the alcohol residue contains 6 to 24 carbon atoms. Particularly useful in this respect are octyl, nonyl, dodecyl, isodecyl, isononyl, tridecyl, tetradecyl, octadecyl, phenyl, benzyl, cyclohexyl and alkylphenyl acrylates and methacrylates, itaconates, maleates and fumarates.

Another useful type of starting material comprises vinyl esters of monocarboxylic acids. Here, oil solubility can be controlled by the size of the hydrocarbon portion of the acid residue. If such ester or mixture of such esters is used to form the copolymer, it is usually desirable that the average group size be at least 8 carbon atoms.

There may also be employed with the monomers mentioned above, for the final copolymer, minor proportions of other monomers, such as acrylic, methacrylic or itaconic acid, maleic anhydride, half esters of maleic, fumaric or itaconic acid, acrylamide, N-substituted acrylamides, methacrylamide, N-substituted methacrylamides, acrylonitrile, methacrylonitrile, vinyl esters of lower monocarboxylic acids, vinyl ethers, vinyl thioethers, vinyl ketones, vinyl chloride and vinylidene chloride.

It is preferred to employ the specific Formula I monomers, described above, with an alkyl ($C_1$–$C_{18}$) methacrylate, alkyl ($C_1$–$C_{18}$) acrylate, acrylamide, acrylonitrile, dialkyl ($C_1$–$C_{18}$) fumarate, dialkyl ($C_1$–$C_{18}$) maleate, styrene or vinyl esters. While in most instances the copolymers of the present invention are prepared from a specific heterocyclic compound, with one of the other listed monomers, it is quite satisfactory for many uses to employ additional monomers as desired in order to arrive at desired properties in the final product.

Homopolymers may be employed in the present compositions so long as they have sufficient oil solubility, as will be understood by those skilled in the art. Copolymers employed in the present compositions may be prepared in a wide range of percentages and molecular units. The valuable properties, described hereinbefore, are observed when as little as 0.5% by weight of the specific Formula I monomers are employed in the copolymer. It is generally preferable to use about 2% or more of the Formula I monomer. As an upper limit, it is preferred to use about 80% by weight of the Formula I monomer in the copolymer.

Polymerization may be carried out in bulk when the monomers are liquids or low-melting solids, in solution, or in either suspension or emulsion. In bulk and solution polymerization, the reaction may be carried out without catalysts, initiated with light and heat, but it is preferred to use one or more of the peroxide or azo initiators which act as free radical catalysts, and are effective between 30° and 150° C. They may be employed in amounts of 0.01% to 10% or more by weight, preferably 0.01% to 1% by weight. Typical initiators include benzoyl peroxide, t-butyl peroxide, acetyl peroxide, capryl peroxide, t-butyl hydroperoxide, cumene hydroperoxide, t-butyl perbenzoate, diisopropylbenzene hydroperoxide, triisopropylbenzene hydroperoxide, methyl cyclohexane hydroperoxide, di-t-butyl peroxide, methylethyl ketone peroxide, azodiisobutyronitrile, azodiisobutyramide, dimethyl, diethyl or dibutyl azodiisobutyrate, azobis-($\alpha,\gamma$-dimethylvaleronitrile), azobis($\alpha$ - methylbutyronitrile), azobis($\alpha$-methylvaleronitrile), dimethyl or diethyl azobis-$\alpha$-methylvalerate and the like.

In conjunction with a hydroperoxide, it is desirable, but not absolutely essential, to supply an activator. Its effect seems at least in part to provide free radicals at somewhat lower temperatures than are effective for free radical formation from hydroperoxides in the absence of such activator.

Especially effective as activators are quaternary ammonium compounds. Typical compounds of this sort are benzyltrimethylammonium chloride, dibenzyldimethylammonium bromide, butyldimethylbenzylammonium chloride, octyltrimethylammonium chloride, dodecyldimethylbenzylammonium chloride, nonylbenzyltrimethylammonium chloride, dodecylbenzyldimethylbenzylammonium chloride, didodecenyldimethylammonium chloride, benzyldimethyldodecenylammonium chloride, octylphenoxyethyldimethylbenzylammonium chloride, diisobutylphenoxyethoxyethyldimethylbenzylammonium chloride, octylpyridinium chloride, N-octyl-N-methylmorpholinium chloride or bis-quaternary salts, such as those having quaternary nitrogens linked with an alkylene group, an ether group or an amide-containing group.

The amount of activator is proportioned to the amount of hydroperoxide. Usually, the proportion of quaternary ammonium compound will be from 5% to 40% of the weight of the hydroperoxide.

Solution polymerization may be carried out in kerosene, mineral oils, diesters, such as di(2-ethylhexyl)adipate or sebacate, chlorinated hydrocarbons, such as chloroform or ethylene chloride, tributylphosphate, dibutyl phenyl phosphate, silicate esters or silicone fluids, benzene, toluene, xylene, solvent naphthas, dioxane, diisobutyl ketone, acetonitrile, dimethyl formamide, t-butyl alcohol and the like, depending on the solubilities of the monomers it is desired to use.

Emulsion polymerization is particularly effective with those members of the heterocyclic series which have low solubilities in water. There may be used in forming the emulsion non-ionic or cationic emulsifiers, such as dodecyldimethylbenzylammonium chloride, dodecylbenzyltrimethylammonium chloride, cetylpyridinum chloride, alkylphenoxypolyethoxyethanols having alkyl groups of about 7 to 18 carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols and the like; polyethoxyethanol derivatives of methyl-linked alkyl phenols; sulfur-containing agents, such as those made by condensing 6 to 60 or more moles of ethylene oxide with nonyl, dodecyl, tetradecyl, t-dodecyl and the like, mercaptans or with alkylthiophenols having alkyl groups of 6 to 15 carbon atoms; ethylene oxide derivatives of long-chained carboxylic acids, such as aluric, myristic, palmitic, oleic and the like or mixtures of acids, such as found in tall oil containing 6 to 60 oxyethylene units per molecule; analogous ethylene oxide condensates of long-chained alcohols, such as octyl, decyl, lauryl or cetyl alcohols, ethylene oxide derivatives of etherified or esterified polyhydroxy compounds having a hydrophobic hydrocarbon chain, such as sorbitan monostearate containing 6 to 60 oxyethylene units, etc.; also ethylene oxide condensates of long-chain or branched-chain amies, such as dodecylamine, hexadecylamine and octadecylamine, containing 6 to 60 oxyethylene groups, block copolymers of ethylene oxide and propylene oxide comprising a hydrophobic propylene oxide section combined with one or more hydrophilic ethylene oxide sections.

In the case of emulsion polymerization especially, a redox catalyst system is extremely effective. This includes the use of an organic peroxide, such as benzoyl peroxide, acetyl peroxide, capryl peroxide and the like, or an inorganic peroxide, such as hydrogen peroxide, ammonium persulfate, sodium persulfate, potassium persulfate or the like. The peroxidic catalyst is effectively coupled with a reducing agent, such as a sulfite, bisulfite, metasulfite or hydrosulfite of ammonium, sodium, potassium or the like.

Polymerization may also be initiated by high-energy irradiation. Suitable sources of high-energy irradiation are radioactive materials and electron accelerators. Useful as radioactive materials that supply gamma rays are irradiated isotopes, such as $Co^{60}$, fission products, such as $Cs^{137}$, adjuncts to fission reactants, such as ratioactive xenon and the like. A $Co^{60}$ source is particularly effective. Useful as radioactive materials that supply beta rays are $Sr^{90}$ and the like. Valuable as electron accelerators which supply beta rays are the Van de Graaf generator, the resonant transformer and the like. Dosages in the range of 10,000 to 10,000,000 REP's preferably 500,000 to 2,000,000 REP's are employed. A REP is equivalent to the ionization produced by the absorption of 93 ergs of energy per gram of irradiated substance. REP stands for roentgen-equivalent-physical and is a unit of intensity and time.

The copolymerization of the monomers, described hereinbefore, may be conducted by mixing all of the monomers to be used at substantially the same time or one of the comonomers may be partially polymerized and then another comonomer or comonomers may be added at a later time either all at once or incrementally. The copolymers of the Formula I monomer may also be prepared as a graft copolymer by carrying out the polymerization of the oil-solubilizing portion of the copolymer to about 40% to 90%, then adding the Formula I monomer either alone or in combination with another ethylenically unsaturated polymerizable monomer, preferably, but not necessarily, in the presence of a free-radical catalyst. The initiator and activator may be employed by incremental addition from time to time or all at once, as desired. Generally, the incremental addition is preferred.

The final copolymer may be taken up in a liquid, such as a petroleum oil or synthetic lubricant, and a concentrate prepared in the range of about 10% to 60% of the copolymer. Volatile solvent and monomer may be volatilized from the mixture of copolymer and oil or synthetic lubricant. The concentrate is convenient for handling, stripping and blending.

Copolymers may be prepared over a wide range of molecular weight by variations in temperature, time, catalyst and particular monomers contemplated. Molecular weights as determined by viscosity methods generally range from about 20,000 to 2,000,000 or more. Low molecular weights are especially desirable when the polymers are to be resistant to shear. The high molecular weight polymers are desired when maximum thickening and other optimum properties are required. Regulation of molecular weights can be accomplished by standard methods, such as by the use of mercaptans, such as octyl mercaptan.

For purposes of determining the extent of copolymerization, there may conveniently be used a simple method which comprises isolating the copolymer from the reaction mixture, as by removal of a volatile solvent. Estimation of the extent of formation of the copolymer is particularly desirable in establishing the proper time of copolymerization for a given system in which proportions of initiator, concentrations and temperatures are fixed.

In one useful form of test for extent of copolymerization, a 1 gram sample of copolymerizing mixture is taken and dissolved in 5 ml. of benzene. The resulting solution is mixed with 15 ml. of methanol. Copolymer precipitates and is separated by centrifuging.

The compositions of the present invention are produced by incorporating from about 0.001% to 10% by weight of at least one of the above-described polymers containing a Formula I monomer in the oil or fuel base contemplated. For lubricant formulations, the polymers of the present invention are used in the amounts of 0.1% to 10.0%, preferably 0.2% to 2.0% by weight. In fuels, the range is 0.001% to 0.1%, preferably 0.005% to 0.05% by weight.

The compositions of the present invention possess the advantageous combination of a high degree of effectiveness with respect to dispersant-detergent properties, pour-point depressing action and viscosity improvements.

The following describes some of the tests employed in evaluating the variable compositions of the present invention:

*Dispersancy test*

A method for determining the dispersing activity of any given polymer is based on the capacity of the polymer to disperse asphaltenes in a typical mineral oil.

The asphaltenes are obtained by oxidizing a naphthenic oil with air under the influence of a trace of iron salt as catalyst, such as ferric naphthenate. The oxidation is desirably accomplished at 175° C. for 72 hours by passing a stream of air through a naphthenic oil. Pentane is added to the cooled, oxidized oil to form a sludge which may be separated by centrifuging. The sludge is freed from oil by extracting it with pentane. It is then taken up with chloroform and the resulting solution is adjusted to a solids content of about 2% (wt. per vol.).

When a polymer is to be examined for its dispersing activity, it is dissolved in a standard oil, such as a solvent-extracted 100 neutral. Blends may be prepared to contain percentages varying from about 2% to 0.01% or even lower of polymer in oil.

A 10 ml. sample of a blend is treated with 2 ml. of the standard solution of asphaltenes in chloroform. The sample and reagent are thoroughly mixed in a test tube and the tube is placed in a forced draft oven at 150° C. for 2 hours to drive off volatile material. The tube is then allowed to cool and the appearance of the sample is noted.

If the polymer has dispersing activity, the oil will appear clear although colored.

Experience has demonstrated that, unless a polymer exhibits dispersing activity at concentrations below about 2% in the above test, it will fail to improve the cleanliness of engine parts in actual engine tests.

*API service MS sequence V–A test*

This test evaluates the sludge dispersant characteristics of a lubricant under low and medium temperature operating conditions. A single cylinder oil test engine is operated under conditions described in ASTM Special Technical Publication No. 315, published by the American Society for Testing and Materials, 1916 Race St., Philadelphia 3, Pa.

The engine may be rated at any time during the course of the test. The 7 parts rated for sludge (CRC Merit, 10=clean) are rocker arm assembly, rocker arm cover plate, valve deck timing gear cover, push rod cover plate, push rod chamber and oil pan.

*Panel coker test*

This test is described in the record of the Fifth World Petroleum Congress (1959) in an article by R. M. Jolie, "Laboratory Screening Test for Lubricating Oil, Detergents and Dispersants." A sample of a compound under test is dissolved in a 170 SUS Mid-Continent Solvent Extracted Neutral containing 1% of a thermally unstable zinc dialkyldithiophosphate. The blend is placed in a heated sump and is splashed against a heated panel held at 570° F. for 2 hours. Gain in weight of the panel is determined and compared with oil without the test compound.

*Sundstrand Pump Test*

In this test for distillate fuel oils, 1 liter of fuel oil containing 4 grams of synthetic sludge is treated with the additive. The oil is circulated for an hour through a Sundstrand oil burner pump containing a 100-mesh strainer. The sludge deposit is collected and weighed. (Nelson, Osterhaut and Schwindeman, Ind. Eng. Chem. 48, 1892 (1956).)

As will be clearly understood in the art, the fuels contemplated are distillate fuels that boil from 75° to 750° F. which includes gasolines, along with jet and diesel fuels and furnace oils. The present compounds are particularly useful in fuels that boil up to about 600° F., that is, the normal gasoline and jet fuels.

Lubricating compositions of this invention may be based on mineral oils or on synthetic lubricants. The mineral oils may vary over a wide range of viscosity, such as 1 to 25 centistokes at 210° F. These oils may be of naphthenic or paraffinic nature or may be of various mixtures. They may be distillates or mixtures of neutral oils and bright stocks. The lubricants may be bodied or gelled and used as greases, if desired. The oils may vary from spindle oils or hydraulic oils to oils for reciprocating aircraft engines. They include oils for sparking combustion and compression ignition engines, varying from grades identified as S.A.E. 5 to S.A.E. 50. Other types of lubricants are also included, such as hydraulic and automatic transmission fluids.

The synthetic lubricants include esters, such as dioctyl, dinonyl or isodecyl adipates, azelates or sebacates, polyethers and silicones. When use as hydraulic fluids is contemplated, phosphate esters are included as a base.

In the present compositions, there may also be used as a base, a transmission fluid, hydraulic fluid, gear oil or grease.

In the compositions of this invention, there may be used one or more other additives, such as anti-oxidants, anti-foam agents, anti-rust agents, anti-wear agents, heavy duty detergents, pour-point depressants, viscosity index improvers, or other type of additive. For example, there may be employed one or more of the dithiophosphates, such as zinc, barium, or nickel dialkylidithiophosphate, sulfurized oils, such as sulfurized sperm oil and sulfurized terpenes, alkylphenol sulfides, alkylaryl sulfonates, petroleum sulfonates whether normal or with alkaline reserve, such as calcium, barium or strontium petroleum sulfonates, polymers and copolymers from alkyl acrylates, methacrylates, itaconates, or fumarates or vinyl carboxylates and mixtures thereof, copolymers of acrylic esters and polar monovinylidene compounds, such as N-vinyl-2-pyrrolidinone, vinylpyridines, aminoalkyl acrylates or methacrylates, or polyethyleneglycol acrylic esters, polybutenes, alkylphenol-alkylene oxide condensates, alkenyl-succinic anhydrides, various silicones and alkyl or aryl phosphates, such as tricresyl phosphates. There may also be used 4,4'-methylenebis-2,6-di-tert-butylphenol, trialkylphenols, tris-(dimethylaminomethyl)phenol, phenothiazine, naphthylamines, N'-sec-butyl-N,N-dimethyl-p-phenylenediamine, alkaline earth alkylphenates, alkaline earth salicylates, calcium phenylstearate, alkylamines, especially $C_{12}$–$C_{24}$ alkylamines, cyclic amines, alkyl and aryl imidazolines and alkenyl succinic anhydrides reacted with amines and then with boron compounds, such as boron oxide boron halides and boron esters.

While a pour-point depressant and a viscosity index improver may be added in addition to a copolymer of this invention, there may be used in place of such separate additives a copolymer of this invention which supplies not only dispersant action, but also one or both of these other actions. Thus, a copolymer of an ester described hereinbefore, which contains some alkyl groups of 16 or more carbon atoms, particularly cetyl or stearyl together with smaller groups, such as myristyl lauryl or octyl will lower the pour point of oils having a waxy pour-point and at the same time improve temperature-viscosity relationships. Improvements in viscosity index can be emphasized by the choice of substituents and such improvements can be had wihout lowering of pour-point if this is desired.

A turbo prop lubricant may be prepared by blending the copolymers of this invention with di-2-ethylhexyl sebacate and a mixture of polyesters formed by condensing 2-ethyl-1,3-hexanediol and sebacic acid into the polyesters with 2-ethylhexanol, there being an average of about 3 glycol units per molecule. This composition may also contain antioxidant, stabilizer or other useful additives.

The polymers are incorporated into fuels or lubricants according to standard procedures and according to the amounts set forth hereinbefore.

The compositions of the present invention may be more fully understood from the following illustrative examples. Parts by weight are used throughout.

EXAMPLE 1

Apparatus is provided equipped with an efficient stirrer, a thermometer, inlet and outlet tubes for gas, and a device for admitting reactants. The apparatus is swept with nitrogen and a slow current of this gas is maintained during the entire polymerization cycle.

There are mixed in the polymerization vessel:
95.5 parts of lauryl-myristyl methacrylate, 96.3% pure by gas-liquid-chromatography (GLC).
8.0 parts of N-(2-methacryloxyethyl)-2-morpholinone containing 89.7% of material with the formula,

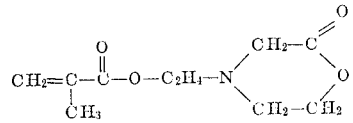

with 4.7% bis-methacrylate and 3.1% of N-(2-hydroxyethyl)-2-morpholinone. 0.2 part of azodiisobutyronitrile (AIBN). 30.0 parts of toluene. 0.1 part n-dodecyl mercaptan.

This charge is heated and stirred at 89–92° C. and copolymerization ensues within 5 minutes. After 35 minutes, 12 incremental additions of 0.8 part of chloroform, 12.5% of AIBN, are added, spaced 30 minutes apart. At 390 minutes, 106 parts of toluene are added to dilute the batch to 41.3% of copolymer, theoretically. At 405 minutes, heating is stopped. The viscous solution which results is clear and yellow in appearance. The solids found by precipitation as copolymer is 40.1%. Elemental analysis on the copolymer shows 0.514% nitrogen by the Kjeldahl method; this value represents 7.8% of N-(2-methacryloxyethyl)-2-morpholinone in the copolymer.

In the asphaltenes test an oil blend containing 0.5% of this copolymer effectively disperses 0.4% of asphaltenes at 150° C.; also, only 0.063% of copolymer is required to disperse 0.2% of asphaltenes at 150° C.

In the Panel Coker Test, a blend containing 3.3% of the above product (30.5% polymer solution) gives a deposit weight of 87 mg. The same oil without the additive gives a deposit weight of 250 mg.

In the Sundstrand Pump Test at 0.033 gram in 100 ml. of oil, the weight of sludge is 189 mg., while the oil without any additive given 226 mg.

3.3 parts of the above product is blended with one part of a commercial zinc dialkyl dithiophosphate, into 95.7 parts of a 170 SUS Mid-Continent Solvent Extracted Neutral Oil. The viscosity of this blend is 8.28 cst. at 210° F. and 48.59 cst. at 100° F. with a viscosity index of 138. The ASTM pour point is −30° F. This blend is evaluated in the Sequence V-A test giving a sludge rating at the end of 75 hours of engine operation of 67.0 (70.0=clean). The value for the reference oil alone is 39.7.

EXAMPLE 2

Using apparatus described in Example 1, there is charged to the reaction vessel:

49.85 parts of lauryl-myristyl methacrylate, 98.3% pure by G.L.C.
1.0 part N-(2-methacryloxyethyl) - 2 - morpholinone, 96.9% pure.
0.1 part azodiisobutyronitrile (AIBN).
15.0 parts toluene.

The copolymerization is effected on stirring and heating at 88–92° C. in a nitrogen atmosphere. Twelve incremental additions of 0.4 part of chloroform, 12.5 percent AIBN by weight, is charged every 0.5 hour after the materials have been heated 0.5 hour. The heating is terminated at 390 minutes. Sixty parts of 100 S.U.S. neutral oil is added to the copolymer and the volatile matter is removed on stirring and heating at 125° C. under a reduced pressure of 1 mm. for 1 hour. The yield of copolymer is 98.9% by precipitation. An oil solution, 35% of copolymer, shows a viscosity of 183 cst. at 210° F., of 1232 cst. at 100° F. The resulting concentrate is useful in providing an effective additive to lube oils, hydraulic fluids, synthetic lubricants, greases, fuel oils and gasolines.

EXAMPLE 3

In another run carried out as described in Example 2, there is allowed to copolymerize lauryl-myristyl methacrylate with N-(2-methacryloxyethyl)-2-morpholinone, using:

48.3 parts of lauryl-myristyl methacrylate, 98.3% pure by GLC.
2.5 parts of N-(2-methacryloxyethyl)-2-morpholinone, 96.9% pure.
0.1 part of AIBN.
15.0 parts of toluene.

On carrying out the reaction, and stripping into 100 S.U.S. neutral oil under the same conditions described above, there results a concentrate, 35% of copolymer, which proves to be facile in treating a mineral, fuel, or hydraulic fluid. It is also useful in treating a synthetic lubricant. This copolymer is obtained in 95.7% yield. An oil solution, 35% of this copolymer has a viscosity of 191 cst. at 210° F., and of 1429 cst. at 100° F.

In another run, 50% of the above N-(2-methacryloxyethyl)-2-morpholinone was replaced by an equivalent amount of N-[3-(crotonoxy) propyl]-5-methyl-2-morpholinone and similar results were obtained.

EXAMPLE 4

Using the apparatus described in Example 1, there is charged to the polymerization vessel:

46.8 parts of lauryl-myristyl methacrylate, 98.3% pure by GLC.
4.1 parts of N-(2-methacryloxyethyl)-2-morpholinone, 96.9% pure.
0.25 part ditertiarybutyl peroxide.
15 parts of toluene.

This charge is stirred and heated at 119°–123° C. in a nitrogen atmosphere. After 390 minutes, the batch is diluted with 59 parts of toluene. The viscosity of the toluene solution at 40% of copolymer, 100° F., is 131 cst.

This copolymer is an effective dispersant of asphaltenes in mineral oil.

EXAMPLE 5

An experiment is performed the same as described in Example 4, except that 0.1 part of benzoyl peroxide is used in place of ditertiarybutyl peroxide and 0.025 part of n-dodecyl mercaptan is added as a chain regulator. This copolymerization is also carried out at 88–92° C. instead of at 119–121° C. After heating 60 minutes, incremental additions of 0.025 part of benzoyl peroxide in 2.5 parts of toluene are added every hour for 6 hours. At 6½ hours, the batch is diluted with 44 parts of toluene. The viscosity of the toluene solution, 40% of copolymer 100° F., is 258 centistokes. This copolymer also proves to be an effective dispersant for asphaltenes in mineral oil.

EXAMPLE 6

Using apparatus as described in Example 1, there is a charged for copolymerization:

40.7 parts of lauryl-myristyl methacrylate, 98.3% pure by GLC.

10.3 parts of N-(2-methacryloxyethyl)-2-morpholinone, 96.9% pure.
0.1 part of AIBN.
15.0 parts of toluene.
0.15 part of n-dodecyl mercaptan.

This charge is heated in a nitrogen atmosphere during 420 minutes, maintaining a batch temperature of 89–92° C. Initiation occurs within 5 minutes as shown by an exotherm. Beginning at 30 minutes and every 30 minutes thereafter for a total of twelve times, 0.4 part of chloroform solution, 12.5% of AIBN is added. At 7 hours, heating is stopped and there results a viscous, hazy and amber colored solution of copolymer.

Some of this copolymer is transferred to 100 S.U.S. neutral mineral oil on stripping off the volatile matter on stirring and heating to 125° C., finally under 10 mm. during 30 minutes. The concentrate which results is 35% of copolymer and at 210° F., its viscosity is 243 centistokes.

Another sample of toluene solution amounting to 35 parts at 66% concentration of a lauryl-myristyl methacrylate: N - (2-methacryloxyethyl)-2-morpholinone=80:20 copolymer prepared in another run is mixed with 25 parts of hydraulic oil (Socony-243 oil) and heated and stirred to 100° C. under 25 mm. and maintained under these conditions for one hour to remove volatile matter. A concentrate weighing 49.3 parts is obtained to which additional (20.2 parts) of hydraulic fluid is added to give a total weight of 69.5 parts. This resulting solution is 35% copolymer. At 210° F., its viscosity is 107 centistokes; at 100° F., its viscosity is 1262 centistokes. From this concentrate, various hydraulic fluids at use concentration can be obtained.

In a similar manner, a portion (39.9 parts of toluene solution at 66% copolymer concentration) is mixed with 30 parts of di-(2-ethylhexyl)sebacate and stirred and heated under reduced pressure (to 120–130° C. under less than 1 mm. pressure) and maintained under these conditions for 0.5 hour. There results a concentrate weighing 57.9 parts to which 21.9 parts more di-(2-ethylhexyl) sebacate is added to give 79.8 parts of solution, 35.0% of copolymer. At 210° F., its viscosity is 212 centistokes; at 100° F., its viscosity is 1562 centistokes. This concentrate proves facile in formulating synthetic lubricants for use in aircraft, space missiles, etc.

EXAMPLE 7

N-(2-Hydroxyethyl-3-propyl)-2-morpholinone,

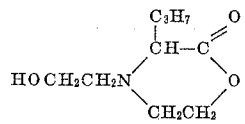

is prepared, B.P. 163° C./0.15 mm. and $n_D^{26}$ 1.4795. An equal molar portion is allowed to react with methacryloyl chloride in the presence of pyridine to give N-(2-methacryloxyethyl-3-propyl)-2-morpholinone.

Apparatus is provided equipped with an efficient stirrer, a thermometer, inlet tubes for gas, and a device for admitting reactants. The reaction vessel is swept with nitrogen and a slow current of this gas is maintained during the entire polymerization cycle.

Di-lauryl-myristyl fumarate is prepared from a commercial mixture composed of 4% n-decanol, 66% n-dodecanol, 27% tetradecanol and 3% n-hexadecanol, using direct esterification with p-toluene sulfonic acid as the catalyst. The crude di-ester is treated with sodium carbonate to remove catalyst and acidity and a 94% yield of fumarate is obtained as a stripped residue.

A mixture composed of 38.5 parts of the di-lauryl-myristyl fumarate, 12.5 parts of vinyl acetate, 4.3 parts of N - (2-methacryloxyethyl-3-propyl)-2-morpholinone, 12.5 parts of toluene, 1.3 parts of benzoyl peroxide, and 0.1 part n-octyl mercaptan, is charged to the reaction vessel. At 0.5 hour, 12.5 parts of toluene is charged. At 2.67, 4,
4.67, 5.3 and 6 hours, incremental additions of 0.52, 0.21, .08, .03 and 0.01 part of benzoyl peroxide in 3 parts of toluene is added respectively. At 6.5 hours, 10 parts more of toluene is added and the batch is allowed to cool. The product is 103 parts of solution and contains 44% of copolymer.

The copolymer is transferred to a mineral oil by heating a portion of this toluene solution in the mineral oil for 90 minutes at 105° C./10 mm. to give a concentrate, 35% of copolymer.

A test blend shows that 0.5% of this copolymer disperses 0.4% of asphaltenes at 150° C.

EXAMPLE 8

There is prepared N-(2-hydroxy-2-methylethyl-6-methyl)-2-morpholinone which boils at 136–138° C./0.5 mm. and has an $n_D^{25}$ of 1.4735.

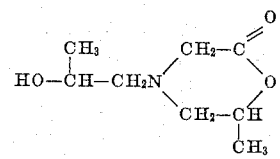

Gas-liquid-chromatography indicates the material to be 97–8% pure.

This material is allowed to react with methacryloyl chloride in the presence of trimethylamine to give N-(2-methacryloxy-2-methylethyl-6-methyl)-2-morpholinone as a stripped residue in the presence of 100 p.p.m. of monomethyl ether of hydroquinone as inhibitor.

Apparatus is employed as described in Example 1 and there is allowed to copolymerize at 104° C. in a nitrogen atmosphere:

| | Parts |
|---|---|
| Di-cetyl-stearyl itaconate | 24 |
| Lauryl-myristyl methacrylate | 10 |
| N - (2 - methacryloxy-2-methylethyl-6-methyl)-2-morpholinone, inhibited stripped residue | 3.5 |
| Toluene | 10.25 |
| n-Dodecyl mercaptan | 0.075 |
| Diisopropyl benzene hydroperoxide, 50% solution as furnished commercially | 0.20 |
| Tert - octylphenoxyethoxyethylbenzyldimethyl ammonium chloride monohydrate, 5% in n-hexanol | 0.20 |

At 24 hours, dilution of the batch is made with 32.8 parts of toluene and there results a solution which analyses 40% of copolymer.

The copolymer is transferred to a petroleum lube oil by heating a portion of the toluene solution with oil under reduced pressure. A 30% concentrate was thus prepared with the final heating at 105° C./10 mm. for 30 minutes.

Application of the standard asphaltenes test to this copolymer shows that 0.5% of this copolymer disperses 0.4% of asphaltenes at 150° C.

In another run, N - (2 - hydroxyethyl)3,3-dimethyl-2-morpholinone,

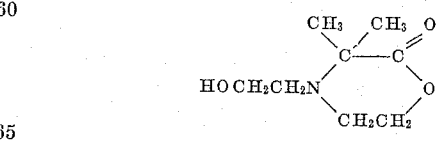

was employed as the Formula I monomer. Its purity exceeds 98% by VPC analysis. This compound melts at 60° C. Its conversion to the methacrylate and use as a comonomer produces essentially the same results as the above methacrylate of N-(2-hydroxy-2-methyl-ethyl-6-methyl)-2-morpholinone.

Similarly, in another run, N-[B-(3-pentenoyloxy) propyl]-3,3-dimethyl-2-morpholinone was employed as the Formula I monomer and equivalent results were obtained.

EXAMPLE 9

In a similar manner, N-(2-hydroxyethyl-3-phenyl)-2-morpholinone,

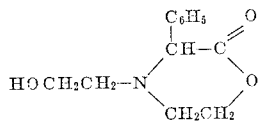

is prepared, B.P. 192° C./0.4 mm. and $n_D^{25}$ 1.5511. On allowing this to react with acryloyl chloride in equimolar portions in the presence of dry pyridine and 100 p.p.m. of monomethylether of hydroquinone, there results N-(2-acryloxyethyl-3-phenyl)-2- morpholinone which is obtained and used as a stripped residue.

A monomeric mixture is made from 9 parts of vinyl stearate, 9 parts of vinyl butyrate, 2 parts of N-(2-acryloxy-ethyl-3-phenyl)-2-morpholinone, 1 part of toluene and 0.06 part of diisopropylbenzene hydroperoxide, 50% solution as furnished commercially.

Five and seven tenths parts of this mixture is mixed with 0.6 part of n-butanol solution, 5% of tert-octylphenoxyethoxyethylbenzyldimethylammonium chloride monohydrate, and charged to the polymerization vessel swept with nitrogen, and heated at 115–118° C. After 20 minutes, the rest of this monomeric mixture is charged during 100 minutes. The batch temperature is kept at 115–118° C. for the first 4 hours, and thereafter at 103° C. for the duration of the heating cycle. Beginning at 2.7 hours and through 6.7 hours, increments of a 50% solution of diisopropylbenzene hydroperoxide, of a 5% n-butanol solution of tert-octylphenoxyethoxyethylbenzyldimethylammonium chloride monohydrate, and of toluene are supplied to a total of 1.02, 0.7, and 10 parts, respectively. At 8 hours, the batch is diluted with 13.2 parts of toluene, heating is terminated, and the batch is allowed to cool to room temperature. The batch amounts to 40 parts and contains by analysis, 41.2% of copolymer. The viscosity of a toluene solution containing 30% of this copolymer is 50 centistokes at 100° F.

A concentrate of this copolymer is prepared by mixing 9.8 parts of the 41.2% copolymer solution with 9.8 parts of lubricating oil and heating to 105° C. with stirring under reduced pressure, finally to 10 mm. for 90 minutes. The resulting oil solution contains 28.3% of copolymer.

Two per cent of this copolymer disperses 0.4% of asphaltenes in a test blend at 150° C. This indicates the phenyl substituted morpholinone-2 supplies dispersancy characteristics to the copolymer.

EXAMPLE 10

N-(diglycol)-2-morpholinone,

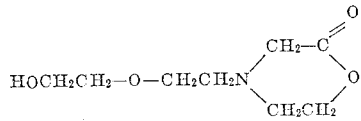

is prepared and has a boiling point of 167–170°/0.3 mm. and an $n_D^{26}$ of 1.4889. It exhibits hygroscopicity and is protected from moisture. It is allowed to react in molar portions with methacryloyl chloride in the presence of dry pyridine to give N-(methacryloxyethoxyethyl)-2-morpholinone as a stripped residue in the presence of 1000 p.p.m. of monomethyl ether of hydroquinone as inhibitor.

A copolymerization vessel is used as described in Example 1. The following monomeric mixture is prepared consisting of 36 parts of cetyl-stearyl methacrylate, derived from a commercial alcohol, 65% $C_{18}$ and 35% $C_{16}$; 36 parts of isodecyl alcohol derived from a commercial $C_{13}$ oxo alcohol, 18.5 parts of n-butyl methacrylate, and 9.5 parts of the N-(methacryloxyethoxyethyl)-2-morpholinone. It is mixed with 30 parts of white mineral oil, 0.1 part n-octyl mercaptan and is catalyzed with 2 parts of a 50% solution of diisopropylbenzene hydroperoxide. Thirty per cent of this catalyzed monomeric mixture is added to the polymerization vessel with 0.4 part of a 25% solution of tert-octylphenoxyethoxyethylbenzyldimethylammonium chloride monohydrate and heated at 115° C. in a nitrogen atmosphere. The time is considered 0.00 hour. After 0.33 hour, the remaining catalyzed monomer mixture is added to the reaction flask during 1.67 hours. An addition of 0.4 part of a 50% solution of diisopropylbenzene hydroperoxide, of 0.08 part of a 25% solution of tert-octylphenoxyethoxyethylbenzyldimethylammonium chloride monohydrate, and of 5 parts of mineral oil is made at 2.67 hours. Additions of 0.6 part of a 50% solution of diisopropylbenzene hydroperoxide, of 0.12 part of a 25% solution of tert-octylphenoxyethoxyethylbenzyldimethylammonium chloride monohydrate, and of 5 parts of mineral oil are made at 4, 4.67, 5.33 and 6 hours, respectively. At 8 hours, 45 parts of mineral oil are needed. The batch is then subjected to reduced pressure cautiously, finally at 115° C./10 mm. for 30 minutes. On venting, mineral oil (117 parts) is then added and mixed into the batch to bring the copolymer concentration to 30%.

This copolymer is an effective dispersant viscosity index improver, and pour depressant. Only 0.063% of copolymer in an oil test blend disperses 0.4% of asphaltenes at 90° C.

A 170 neutral oil containing 2.33% of this copolymer shows a viscosity of 11.03 cst. at 210° F., of 63.48 cst. at 100° F., and has a viscosity index of 144.

A midcontinent solvent extracted 180 neutral oil containing 2.0% of this copolymer has a pour point of −35° F. The pour point of this oil without any copolymer is +50 F.

EXAMPLE 11

Other nitrogen-containing polymerizable monoethylenically unsaturated compounds may be used with the polymerizable monomer containing the 2-morpholinone group. For example, the procedure of Example 1 is used with 95.5 parts of the lauryl-myristyl methacrylate, 2.25 parts of N-(2-methacryloxyethyl)-2-morpholinone, and 2.25 parts of N-vinyl-2-oxazolidinone. The copolymer is obtained in 93% yield. It functions as well as a dispersant for asphaltenes as the copolymer described in Example 1.

In another run, using the above proportions, N-vinyl-2-pyrrolidinone was employed in place of the N-vinyl-2-oxazolidinone and similar results were obtained.

EXAMPLE 12

Using the apparatus described in Example 1, there is prepared a monomeric mixture composed of 36 parts of cetyl-stearyl methacrylate, 37 parts of lauryl-myristyl methacrylate, 17.5 parts of styrene, and 9.5 parts of N-(2-methacryloxyethyl)-2-morpholinone. This is treated with 0.50 part of AIBN, 0.05 part n-octyl mercaptan, and 20 parts of toluene. Thirty percent of this catalyzed monomeric mixture is added to the polymerization vessel and heated at 85–90° C. The time is considered 0.00 hour. After 0.33 hour, the remaining catalyzed monomeric mixture is added to the polymerization flask over 1.67 hours, maintaining a batch temperature of 85–88° C. An addition of 0.1 part of AIBN with 5 parts of toluene is charged at 3.67 hours. Additions of AIBN with 5 parts of toluene are made at 5, 5.67, 6.33, and 7 hours, respectively. At 7.5 hours, 100 parts of toluene is added and the heating is stopped at 7.67 hours. The resulting toluene solution analyzes 38.3% of copolymer. When tested for dispersancy, 0.25% of copolymer in an oil test blend is found to disperse 0.4% asphaltenes at 150° C.

EXAMPLE 13

A polymerization vessel is equipped with a gas inlet and outlet tube, a condenser, a circular-type agitator, and an addition funnel. The system is flushed with nitrogen, and the bath surrounding the polymerization vessel is maintained at an initial temperature of 110° C. A monomeric mixture is prepared from 36 parts of lauryl acrylate, 18 parts of methyl acrylate, 3.0 parts of toluene, 0.24 part of a diisopropylbenzene hydroperoxide solution, 50% active ingredient, and 0.24 part of a tert-octylphenoxyethoxyethylbenzyldimethylammonium chloride monohydrate, 5% active ingredient. This monomeric mixture is added to the reaction vessel and heated with the bath at 110–113° C. At 0.42 hour, 60 parts of toluene is added. After a heating period of 2.0 hours, a second monomer mixture composed of 6 parts of N-(2-methacryloxyethyl)-2-morpholinone (a formula monomer), 13 parts of toluene, 0.04 part of a diisopropylbenzene hydroperoxide solution, 50% active ingredient, and 0.04 part of a tert-octylphenoxyethoxyethylbenzyldimethylammonium chloride monohydrate, 5% active ingredient, is added to the reaction mixture. Five additions each of 0.04 part of a diisopropylbenzenehydroperoxide solution, 50% active ingredient, 0.04 part of a tert-octylphenoxyethoxyethylbenzyldimethylammonium chloride monohydrate solution, 5% active ingredient, in 10 parts of toluene are made at 2.67, 3.33, 4.0, 4.67 and 5.33 hours. At 6.0 hours, 50 parts of toluene are added. The temperature is maintained at 107–108° C. throughout the polymerization cycle until 6.5 hours when heating is stopped. The product is a 22.9% solution of copolymer in toluene and gives a viscosity of 450 centistokes at 100° F. One-half per cent of this copolymer in an oil test blend disperses 0.4% asphaltenes at 150° C.

A similar run was made except that N-[3-(crotonoxy)-propyl]-5-methyl-2-morpholinone was employed as the Formula I monomer.

EXAMPLE 14

A run is made the same as described in Example 2 except that a mineral oil is used as the solvent. The composition of the monomeric mixture used is:

49.85 parts of lauryl-myristyl methacrylate.
1.0 part of N-(2-methacryloxyethyl)-2-morpholinone.
0.8 part of chloroform solution, 12.5% of AIBN.
5.0 parts 100 S.U.S. neutral mineral oil.

This charge is heated at 88–94° C. and a vigorous exotherm occurs within 6 minutes so that temporary cooling is used to maintain a batch temperature under 94° C. Beginning at 0.5 hour and every 0.5 hour for ten periods, there is charged 0.4 part of the chloroform solution, 12.5% of AIBN. At 2.1 and 5.5 hours, dilution is made with 5 and 55 parts of the 100 S.U.S. neutral mineral oil, respectively. Heating and stirring is discontinued at 6 hours. The product analyzes 42.43% of copolymer. A portion was diluted to 35% of copolymer with 100 S.U.S. neutral mineral oil and at 210° F., the viscosity is 1080 centistokes. This neutral mineral oil, without any copolymer, has a viscosity of 9.59 cst. at 210° F. The higher molecular weight of this copolymer in comparison to the copolymer described in Example 2 makes this copolymer a more efficient viscosity index improver.

Lower alkyl acrylic and methacrylic esters, here meaning esters having alkyl groups smaller than eight carbon atoms and derived from acrylic or methacrylic acid, are of particular interest, because in general they possess polymerizing characteristics similar to the acrylic esters which supply oil-solubility. Presence of small alkyl groups in copolymers may help improve such properties as pour point depressions and viscosity index improvement. Typical lower acrylic and methacrylic esters are methyl, ethyl, propyl, butyl, amyl, and hexyl acrylates and methacrylates. These lower alkyl acrylic esters may be employed in amounts ranging from as low as 0 to 5% to as high as 65% and generally the amount will vary from 5–30%.

I claim:
1. A composition comprising a major portion of a member from the group consisting of a lubricating oil and a normally liquid hydrocarbon fuel and a minor portion sufficient to prevent sludge deposition of an oil-soluble copolymer made from at least one monomer selected from the group consisting of $C_{1-18}$ alkyl esters of $\alpha,\beta$-unsaturated lower alkanoic acids, dialkyl fumarates, maleates and itaconates of up to 24 carbon atoms, vinyl esters of fatty acids and styrene and at least one compound having the formula

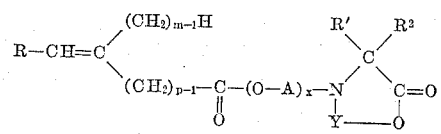

wherein R is selected from the group consisting of H and methyl,
   $m$ is an integer having a value of 1 to 3, preferably 1–2,
   $p$ is an integer having a value of 1 to 4,
   $x$ is an integer having a value of 1 to 40, preferably 1–2,
   A is an alkylene group having 2 to 4 carbon atoms,
   $R'$ and $R^2$ are selected from the group consisting of (1) a composite group which forms a cyclic ($C_5$ to $C_7$) hydrocarbon group with the adjoined C atom and (2) separate groups in which $R'$ is selected from the group consisting of H, ($C_1$–$C_8$) alkyl, and phenyl and $R^2$ is selected from the group consisting of H and ($C_1$–$C_8$) alkyl,
   Y is an alkylene group having 2 to 3 carbon atoms, A and Y having at least two carbon atoms extending in a chain between the adjoined O and N atoms, with the provisos that, when $p$ is greater than 1, $m$ is 1 and, when $m$ is greater than 1, R is H, said compound being present in an amount from about 0.5 to 80% by weight of the copolymer.
2. A composition according to claim 1 in which there is employed at least 0.1% and up to about 10% by weight of said copolymer in a lubricating oil.
3. A composition according to claim 1 in which there is employed at least 0.001% and up to about 0.1% by weight of said copolymer in a hydrocarbon fuel.
4. A composition according to claim 1 in which there is employed at least 2% by weight of said compound.
5. A composition according to claim 1 in which said monomer is alkyl ($C_1$ to $C_{18}$) methacrylate.
6. A composition according to claim 1 in which said monomer is alkyl ($C_1$ to $C_{18}$) acrylate.
7. A composition according to claim 1 in which said monomer is dialkyl ($C_1$ to $C_{18}$) fumarate.
8. A composition according to claim 1 in which said monomer is dialkyl ($C_1$ to $C_{18}$) maleate.
9. A composition according to claim 1 in which said monomer is dialkyl ($C_1$ to $C_{18}$) itaconate.
10. A composition according to claim 1 wherein said monomer is lauryl-myristyl methacrylate.
11. A composition according to claim 1 wherein said monomer comprises cetyl-stearyl methacrylate.
12. A composition according to claim 1 in which said monomer comprises a vinyl ester in which the carboxylate portion contains 1 to 18 carbon atoms, including the carbon of the carboxylate function.

References Cited

UNITED STATES PATENTS

| 3,218,258 | 11/1965 | Bauer et al. | 44—63 XR |
| 3,251,775 | 5/1966 | Bauer | 44—63 XR |
| 3,293,182 | 12/1966 | Bauer et al. | 44—62 XR |
| 3,304,260 | 2/1967 | Fields et al. | 252—51.5 |
| 3,321,405 | 5/1967 | Mottus et al. | 252—51.5 |

DANIEL E. WYMAN, *Primary Examiner.*

PATRICK P. GARVIN, *Examiner.*